US008534508B2

(12) United States Patent
Bush

(10) Patent No.: US 8,534,508 B2
(45) Date of Patent: Sep. 17, 2013

(54) STORAGE DISPENSER APPARATUS FOR AIDS, CONSUMABLES AND UTENSILS

(76) Inventor: Jerry Dwight Bush, Suwanee, GA (US)

(*) Notice: Subject to any disclaimer, the term of this patent is extended or adjusted under 35 U.S.C. 154(b) by 952 days.

(21) Appl. No.: 11/869,617

(22) Filed: Oct. 9, 2007

(65) Prior Publication Data

US 2008/0083755 A1     Apr. 10, 2008

Related U.S. Application Data

(60) Provisional application No. 60/850,430, filed on Oct. 10, 2006.

(51) Int. Cl.
*G01F 11/20* (2006.01)
(52) U.S. Cl.
USPC .......................... 222/412; 222/129.1; 222/164
(58) Field of Classification Search
USPC ............... 222/412, 413, 185.1, 181.1, 181.2, 222/180, 182–184, 129.1–129.4, 130–142, 222/144, 144.5, 145.1, 145.2, 164–166; 220/476–482, 669
See application file for complete search history.

(56) References Cited

U.S. PATENT DOCUMENTS

| 359,347 A * | 3/1887 | Cox ............................... 209/245 |
| 924,197 A * | 6/1909 | Shook ............................ 312/327 |
| D46,699 S * | 11/1914 | Schuiling ........................ D7/589 |
| 1,219,657 A * | 3/1917 | Melchert .......................... 312/35 |
| 1,529,379 A * | 3/1925 | Thompson ..................... 222/413 |
| 2,535,476 A | 12/1950 | Anderson |
| 2,551,305 A | 5/1951 | Tompkins |
| 3,097,765 A | 7/1963 | Newton |
| 3,344,958 A * | 10/1967 | Kaanehe ..................... 222/181.2 |
| 4,287,921 A * | 9/1981 | Sanford ......................... 141/360 |
| 4,903,866 A * | 2/1990 | Loew ............................. 222/129 |
| 4,964,543 A * | 10/1990 | Scheiber ........................ 222/180 |
| 5,222,634 A * | 6/1993 | Hayes ......................... 222/185.1 |
| 5,593,067 A * | 1/1997 | Shaw et al. ................... 222/108 |
| 5,845,980 A | 12/1998 | Fricano |
| 6,293,434 B1 * | 9/2001 | Ellis et al. ..................... 222/135 |
| 7,461,763 B1 * | 12/2008 | Winn ............................ 222/413 |
| 2007/0181613 A1 * | 8/2007 | Ben-Shlomo et al. ........ 222/413 |

* cited by examiner

*Primary Examiner* — Lien Ngo
(74) *Attorney, Agent, or Firm* — Crose Law LLC; Bradley D. Crose

(57) ABSTRACT

An under counter storage and dispensing device for dry flowable consumables is disclosed. The storage dispenser is comprised of a mounting plate adapted for attachment to the underside of a wall kitchen cabinet, a central compartment connected to the mounting plate and configured for storage and dispensing of a dry flowable consumable. The storage dispenser is further comprised of compartments adjacent to the central compartment, which are configured for storage and retrieval of condiments and/or accessories for the dry flowable consumable, e.g. sugar packets, stirrers, filters. These adjacent compartments are also connected to the mounting plate.

29 Claims, 12 Drawing Sheets

STORAGE DISPENSER APPARATUS FOR AIDS, CONSUMABLES AND UTENSILS

This application claims the benefit of the filing date of U.S. Provisional Patent Application 60/850,430 filed on Oct. 10, 2006, which is incorporated herein in its entirety.

FIELD OF THE INVENTION

The technology disclosed herein relates generally to storage and dispensing devices, and, more particularly, to under-counter storage and dispensing devices for dry flowable consumables.

BACKGROUND OF THE INVENTION

Effective use of counter space and being time efficient are two issues facing most people. Today's lifestyles are busier and faster paced than in simpler times past, plus the average person's living quarters are becoming more and more crowded with all of the modern gadgets and conveniences now available.

These issues have created a need for appliances that free-up counter top space as well as cabinet space while eliminating some of the steps in selected repetitive kitchen tasks To address these issues a well-designed kitchen appliance ideally should make the best possible use of counter and cabinet space in addition to doing the job for which it is designed. For example, a well designed appliance ideally should:

1) Make the job easier
2) Elevate convenience for the user as compared to conventional methods
3) Save time for the user by reducing the number of steps previously required to perform the same task.
4) Require less counter space or better still, no counter space at all or for its own existence and
5) Reclaim entirely, or to the greatest extent possible, the space previously required to store those items associated with the appliance's function and purpose.

In general, the footprint required to operate any device is at least twice the footprint required for simply storing the appliance. Therefore, the need exists to increase available storage space without diminishing existing work area surface space.

Virtually every household stores, dispenses and prepares a variety of dry, flowable consumables such as coffees, teas, infant dry mix cereals, infant formulas, whole food powders, protein powders etc. on a regular basis. In addition to dispensing these products and preparing them for consumption an area is dedicated to storing the consumable itself. The consumable is traditionally stored in its original package, which requires space in the kitchen cabinets or the kitchen pantry. Additionally, optimizing the preparation workflow process requires positioning the raw goods and the appliances as closely together as possible.

Time and motion considerations, process sequence and work order flows are important when trying to achieve maximum efficiency in any preparation effort. Wasted seconds add up to wasted minutes. Consideration must be given to the position and the flow of the raw goods from the beginning through all the steps required in the preparation process—all the way to final product to be consumed by a user.

Coffee has emerged as a beverage of choice for the majority of Americans. A reported 80% of those over the age of 18 drink an average of 3.3 cups daily. Today, coffee is available in many blends, brewed and consumed in exotic forms like Espressos, Cappuccinos and Lattes. The trend is clear. People are drinking more coffee. In addition to coffee, there is the myriad of exotic teas available from all over world.

The preparation process workflow in a kitchen is similar to process flows in a large manufacturing facility. Both the kitchen and manufacturing plant create a consumable product which begins with raw goods and present a finished product at the end of the line. A number of repetitive steps are involved in every consumer's daily coffee or tea brewing ritual.

A time and motion study illustration of the maneuvers and ergonomics involved in preparing a simple cup of coffee are as follows:

1) Purchase the coffee beans or ground coffee
2) When returning from the store, remove the coffee from the vehicle and carry it into the kitchen
3) Remove coffee from the grocery bag
4) Find a place in the pantry or cabinet to store the coffee. When ready to prepare a cup of coffee
5) Walk to the pantry or cabinet
6) Retrieve the coffee beans or ground coffee
7) Carry the beans or pre-ground from the panty or cabinet to the counter area where the coffee maker is positioned.
8) Open the container
9) Scoop the desired amount of beans or pre-ground coffee via a measuring spoon into a bean grinder (steps requiring the grinding of beans is obviously not required for pre-ground coffee)
10) Grind the beans
11) Retrieve a filter from the cabinet or panty and place it into the coffee maker.
12) Pour the ground beans or pre-grind into the filter.
13) Add water to the coffee maker and brew.
14) Reseal the container in which the remaining beans or pre-grind will be stored
15) Carry the beans to the pantry
16) Place container of beans on the pantry or cabinet shelf
17) Walk back to the coffee maker.

Another issue is the cumbersome and usually messy reach into the mouth of a large jar to scoop a flowable, powered type of product as the level of the flowable itself drops, due to consumption of the product. Many companies who provide powdered green food supplements, bodybuilding supplements and other powdered or otherwise dry flowable products, package these products in large plastic jar containers. These containers range in size from approximately 600 content grams to as many as 4000 content grams. These containers do an excellent job as retail display vehicles and provide the consumer a stable, wide base, airtight container in which they will store the product between uses. In practice however, these containers are sold by weight, not by volume and the volume puts the consumable level at about ½ the container depth making it always necessary for the consumer to blindly reach a hand into the jar to find the measuring scoop supplied and to retrieve the product one scoop at a time.

Several problems occur in this situation:

1) Some hands, especially the hands of a body builder, are too large to easily fit past the opening making it difficult to reach the scoop and retrieve the product especially once the level has dropped significantly from top of the opening which again is usually from the time of purchase.
2) Hands which fit through the opening will inevitably get the product all over both the front and back of the hand, the wrist and even the lower arm, which often includes a shirtsleeve. This is usually unavoidable since powdered remnants cling to the sidewalls and around the container neck. In addition to this aggravation, there is the wasted time and cleanup are required to rid the hands, arm and shirt of the remnants of the pricy flowable, which generally winds up on the countertop as the scoop is withdrawn in an effort to keep the scoop upright.

With the availability of attractive and affordable home coffee and tea systems that can now make as little as one cup at a time, consumers finds themselves with a wider selection to choose from and less counter and shelf space than ever to store the associated brewing paraphernalia.

Due to these and others reasons, there is a need for a new appliance to reclaim precious counter and pantry space, reduce the number steps involved in the whole preparation process in addition to simplifying the actual steps involved in the brewing process while reclaiming precious time currently wasted in the repetitious process.

Related art that addresses these and other problems includes the following patents.

U.S. Pat. No. 1,184,379, issued to Ritter on May 23, 1916, discloses a supporting device for flour bins and the like.

U.S. Pat. No. 2,535,476, issued to Anderson on Dec. 26, 1950, discloses a material handling apparatus.

U.S. Pat. No. 2,551,305, issued to Tompkins on May 1, 1951, discloses a kitchen cabinet.

U.S. Pat. No. 3,097,765, issued to Newton on Jul. 16, 1963, discloses an apparatus for puncturing and dispensing a measured quantity of material.

U.S. Pat. No. 5,845,980, issued to Fricano et al. on Dec. 8, 1998, discloses an overhead storage cabinet having a housing defined by top and bottom wall rigidly joined by end walls to define an interior storage compartment therein. A door assembly is vertically swingably mounted on the housing and includes a door panel which vertically closes a front access opening of the housing when in an open position, and which swings upwardly into an open position wherein the door panel is stored generally above the top wall. The door assembly includes end panels which exteriorly overlap and are hingedly couple to the end walls. The end panels mount one or more counterweight elements adjacent the ends thereof to counterbalance the door panel weight. The number or position of counterweight elements is selected in accordance with the longitudinal length of the door panel. The end panel also has an edge profile provided with a grip part which moves between positions disposed adjacent the lower rear and lower front corners of the housing as the door is respectively swingably moved between closed and open positions to facilitate access thereto and convenient manual swinging of the door, particularly in the closing direction. The door panel and top wall of the housing also have an interlock extending longitudinally therealong and engaged when the door is closed to prevent outward bowing of the door relative to the housing.

While these patents and other previous methods have attempted to solve the problems that they addressed, none have utilized or disclosed a combined space-saving storage and dispensing device, as does embodiments of the technology disclosed herein.

Therefore, a need exists for a combined space-saving storage and dispensing device with these attributes and functionalities. The combined space-saving storage and dispensing device according to embodiments of the invention substantially departs from the conventional concepts and designs of the prior art. It can be appreciated that there exists a continuing need for a new and improved combined space-saving storage and dispensing device which can be used commercially. In this regard, the technology disclosed herein substantially fulfills these objectives.

The foregoing patent and other information reflect the state of the art of which the inventor is aware and are tendered with a view toward discharging the inventor's acknowledged duty of candor in disclosing information that may be pertinent to the patentability of the technology disclosed herein. It is respectfully stipulated, however, that the foregoing patent and other information do not teach or render obvious, singly or when considered in combination, the inventor's claimed invention.

BRIEF SUMMARY OF THE INVENTION

In general, the technology disclosed herein features a combined space-saving storage and dispensing device adapted for installation underneath a kitchen cabinet.

The technology disclosed herein stores and dispenses dry flowable consumables such as, but not limited to, teas, ground coffee, whole coffee beans, dry infant formulas, dry infant cereals, dry powered whole foods, protein powders, etc.

In an exemplary embodiment a storage dispenser is comprised of a mounting plate adapted for attachment to the underside of a wall kitchen cabinet, a central compartment connected to the mounting plate and configured for storage and dispensing of a dry flowable consumable. The storage dispenser is further comprised of adjacent compartments configured for storage and retrieval of condiments and/or accessories for the dry flowable consumable, e.g. sugar packets, stirrers. These adjacent compartments are also connected to the mounting plate.

The storage dispenser is mounted or otherwise attached within the cavity commonly found on the underside of standard constructed kitchen cabinets, or any downward facing planar surface. The storage dispenser incorporates an internal transport mechanism within the central compartment to collect, transport and accurately meter and dispense the desired quantity of a granular or otherwise dry flowable substance. Depending on the embodiment the storage dispenser is equipped with a manual dispensing knob, touch-activated metered selection, a powered coffee bean grinder (either electric or battery), a clock, etc.

In one embodiment the storage dispenser stands alone. In another embodiment the storage dispenser is operable to couple with one or more similar units, thus permitting multiple dry flowable materials, e.g. decaf coffee and regular coffee, to be dispensed from similarly positioned bays built into or otherwise attached to the primary unit.

The side compartments are configured to hold for retrieval accessories, condiments, spices, culinary accessories, e.g., cutting implements, filters, prepackaged goodies etc. The primary dispenser and the side containers are secured with commercially available fasteners to the cabinet underside and offered to the consumer in various combinations and configurations, which best support the consumables being stored and dispensed.

As compared to the standard steps study referenced above, and in addition to the space/money saving benefits, which the storage dispenser reduces the number of steps from seventeen (17) to eight (8) as follows.

1) Purchase the coffee beans or ground coffee
2) Returning from the store, remove the coffee from the vehicle and carry it into the kitchen
3) Remove coffee from the grocery bag
4) Pour the contents into the invention and dispose of the bag. When ready to prepare a cup of coffee
5) Retrieve a filter from a side compartment and place it beneath the dispensing spout to collect the ground coffee.
6) Turn the knob on the invention to select the number of cups of coffee desired and press the grind button.
7) Place the filter containing the coffee in the coffee maker 8) Add water to the coffee maker and brew.

Using coffee storage and preparation as an example, it is reasonable to expect that installation of the storage dispenser will free-up 1 to 1½ square foot of counter and or shelf space In addition to its time savings and convenience benefits means the storage dispenser will, at an average cost of $145 a foot to $550 a foot for kitchen counter space, return some very valuable real estate to a consumer for other uses.

One advantage of the technology disclosed herein is that it frees up kitchen counter space.

Another advantage of the technology disclosed herein is that it frees up cabinet storage space.

Another advantage of the technology disclosed herein is that it is more efficient to use.

Another advantage of the technology disclosed herein is that it is easy to use.

Another advantage of the technology disclosed herein is that it may be operated with one hand.

Another advantage of the technology disclosed herein is that it may be made from readily available materials.

Another advantage of the technology disclosed herein is that it may be economically produced.

Other objects, advantages and capabilities of the technology disclosed herein are apparent from the following description taken in conjunction with the accompanying drawings showing the preferred embodiment of the invention.

BRIEF DESCRIPTION OF THE SEVERAL VIEWS OF THE DRAWINGS

The technology disclosed herein, together with further advantages thereof, may best be understood by reference to the following description of the simplest form of the invention, taken in conjunction with the accompanying drawings in which.

DETAILED DESCRIPTION OF THE INVENTION

The technology disclosed herein will now be described in detail with reference to at least one preferred embodiment thereof as illustrated in the accompanying drawings. In the following description, numerous specific details are set forth in order to provide a thorough understanding of the technology disclosed herein. It will be apparent, however, to one skilled in the art, that the technology disclosed herein may be practiced without some or all of these specific details. In other instances, well known operations have not been described in detail so not to unnecessarily obscure the technology disclosed herein.

Figure 1:
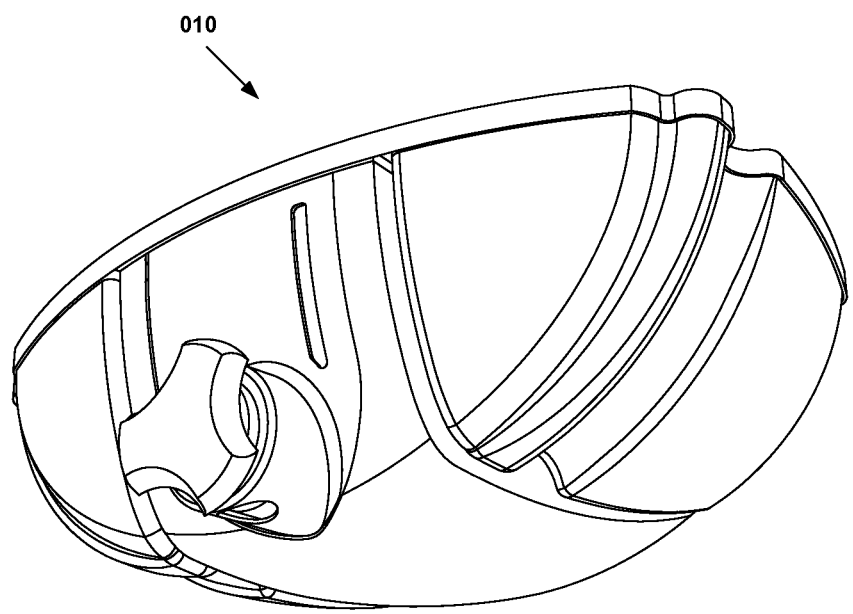
FIG. 1 illustrates a bottom perspective view of a storage dispenser, according to an embodiment of the technology disclosed herein.
Figure 2:
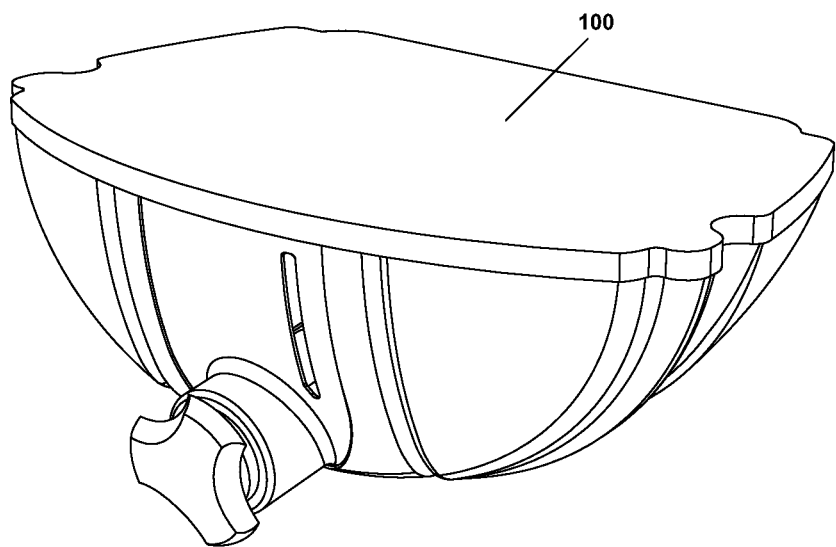
FIG. 2 illustrates a top perspective view of a storage dispenser, according to an embodiment of the technology disclosed herein.
Figure 3:
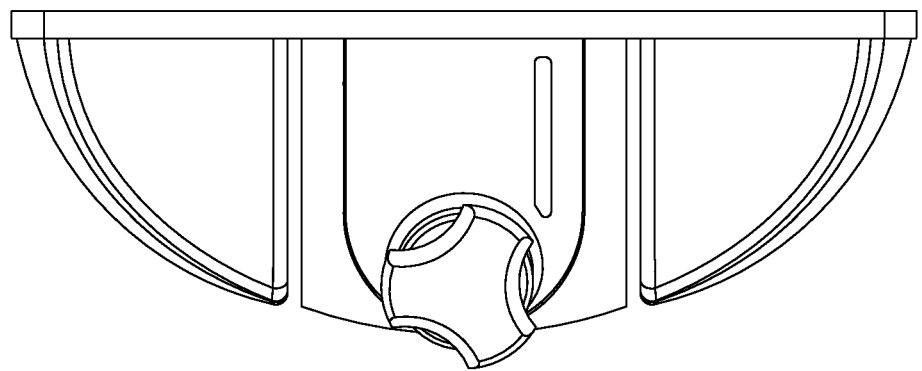
FIG. 3 illustrates a front plan view of a storage dispenser, according to an embodiment of the technology disclosed herein.
Figure 4:
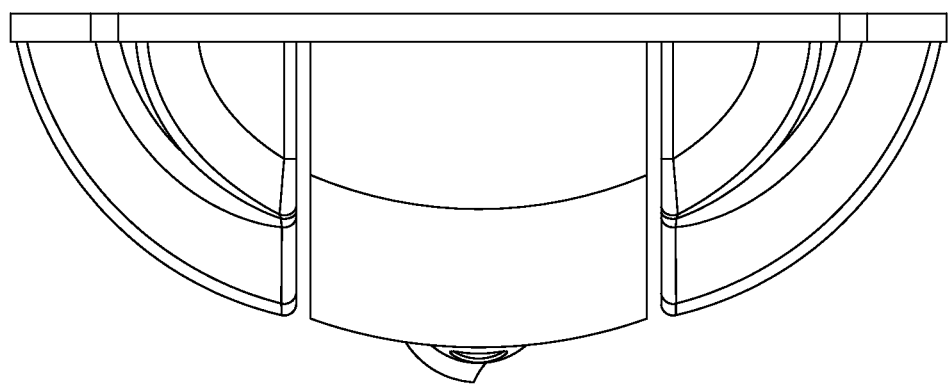
FIG. 4 illustrates a rear plan view of a storage dispenser, according to an embodiment of the technology disclosed herein.
Figure 5:
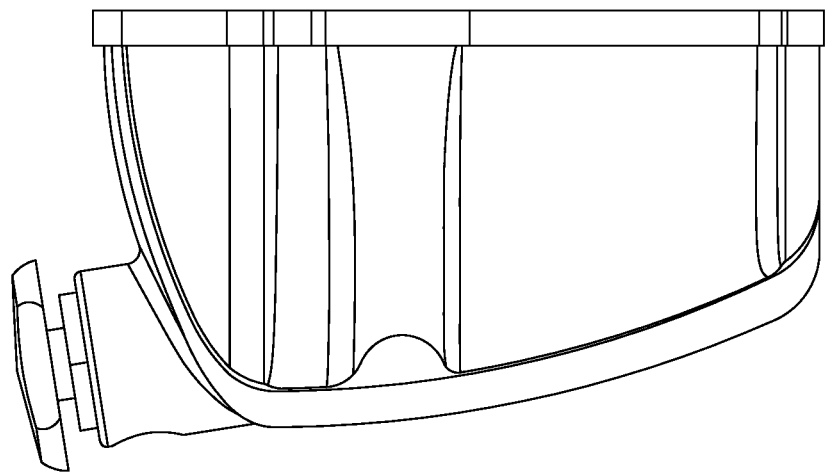
FIG. 5 illustrates a left side plan view of a storage dispenser, according to an embodiment of the technology disclosed herein.
Figure 6:
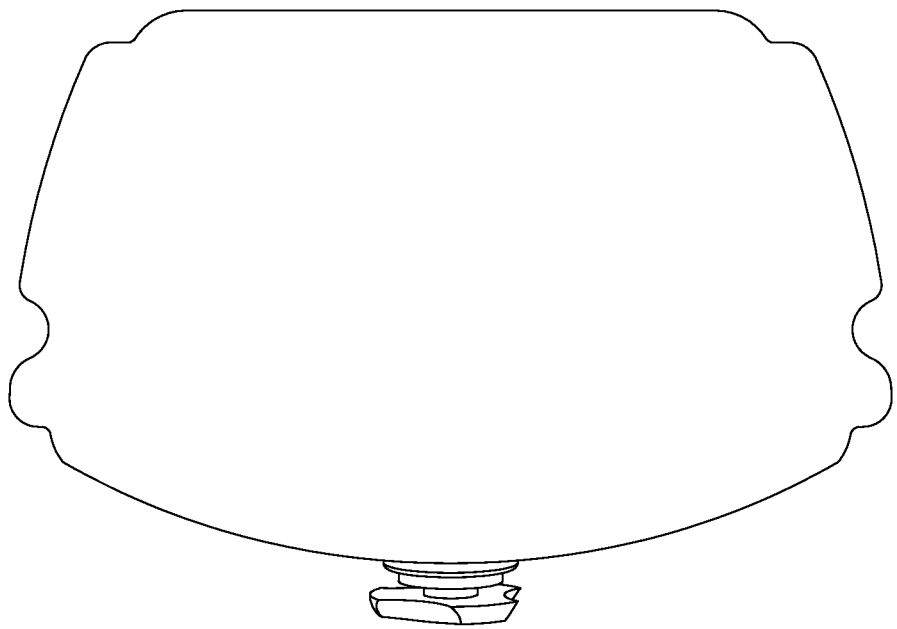
FIG. 6 illustrates a top plan view of a storage dispenser, according to an embodiment of the technology disclosed herein.
Figure 7:
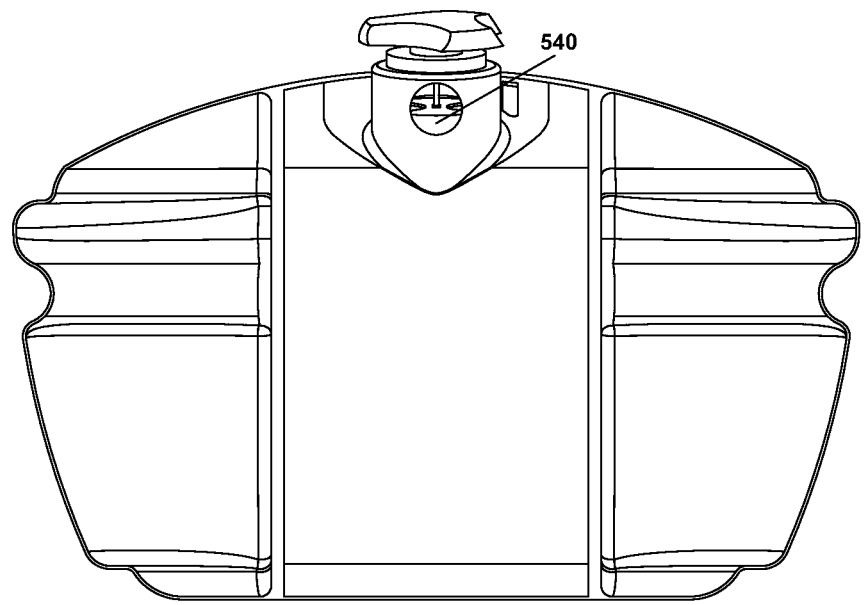
FIG. 7 illustrates a bottom plan view of a storage dispenser, according to an embodiment of the technology disclosed herein.
Figure 8:
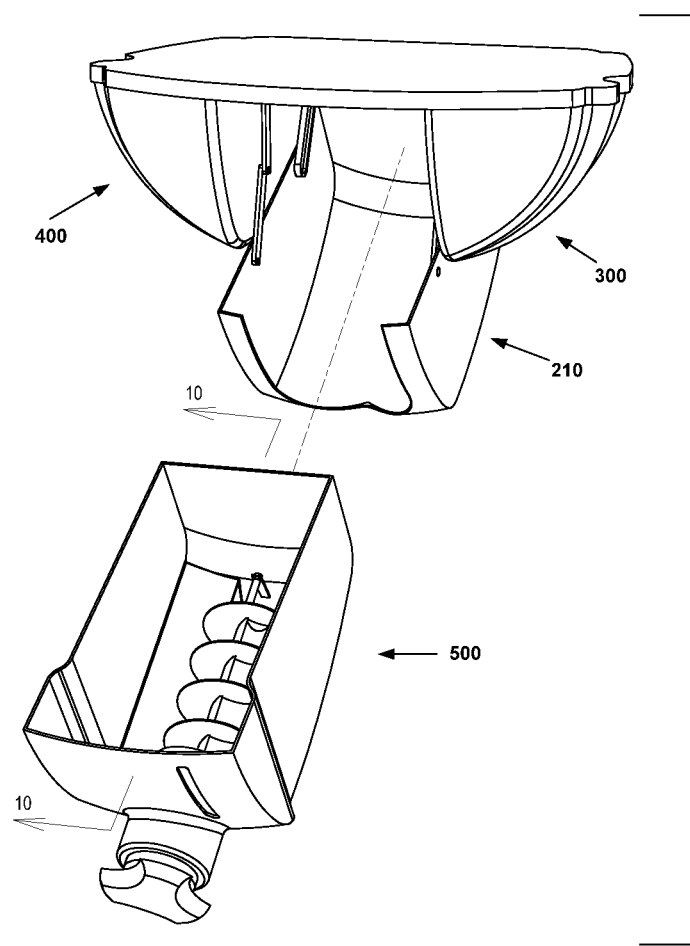
FIG. 8 illustrates an exploded view of a storage dispenser showing further detail of the central compartment, according to an embodiment of the technology disclosed herein.
Figure 9:
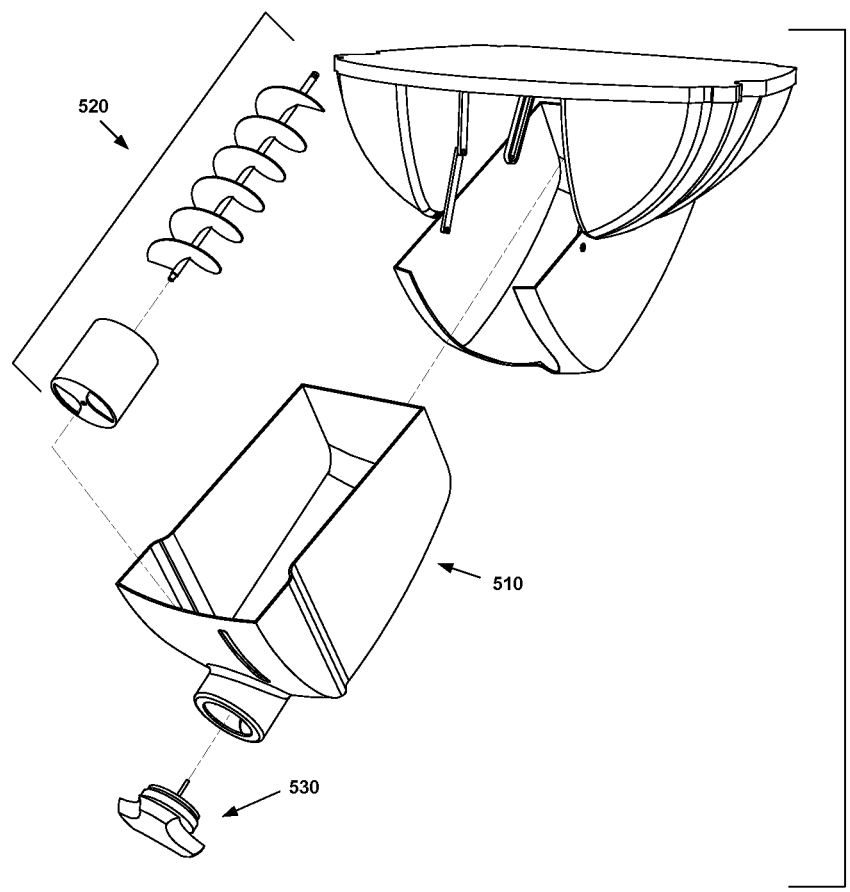
FIG. 9 illustrates an exploded view of a storage dispenser showing the relationship of the parts of the central compartment, according to an embodiment of the technology disclosed herein.
Figure 10:
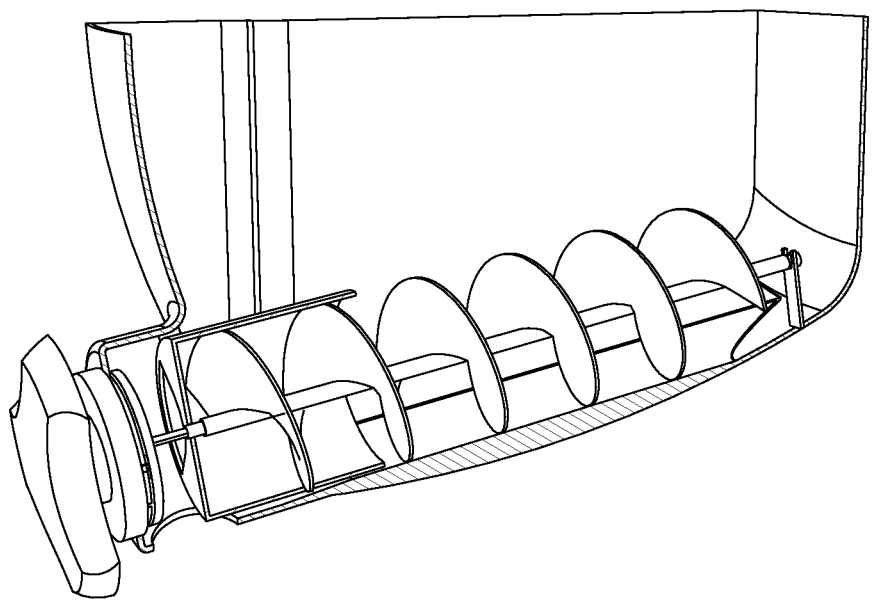
FIG. 10 illustrates a sectional view of a dispensing sub-assembly for a storage dispenser, according to an embodiment of the technology disclosed herein.
Figure 11:
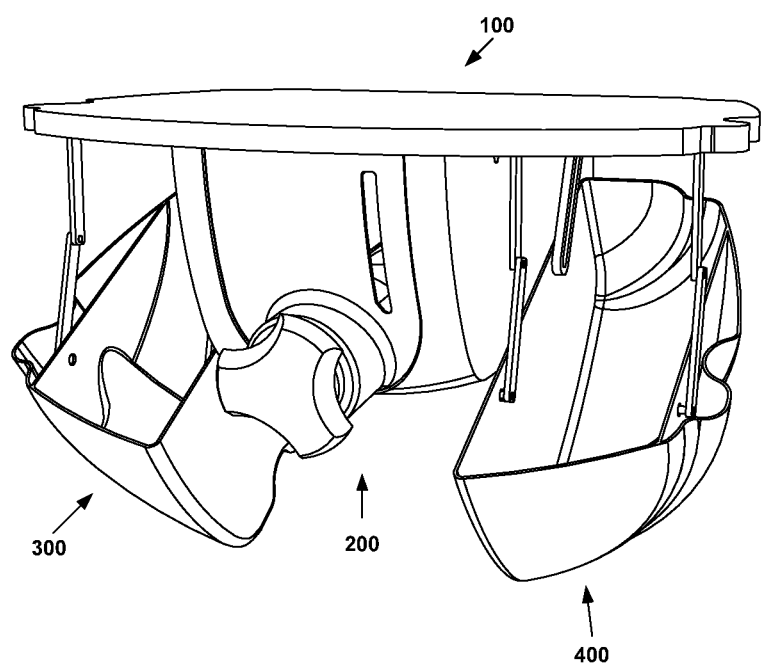
FIG. 11 illustrates an alternate position view of a storage dispenser showing the left and right compartments open, according to an embodiment of the technology disclosed herein.
Figure 12:
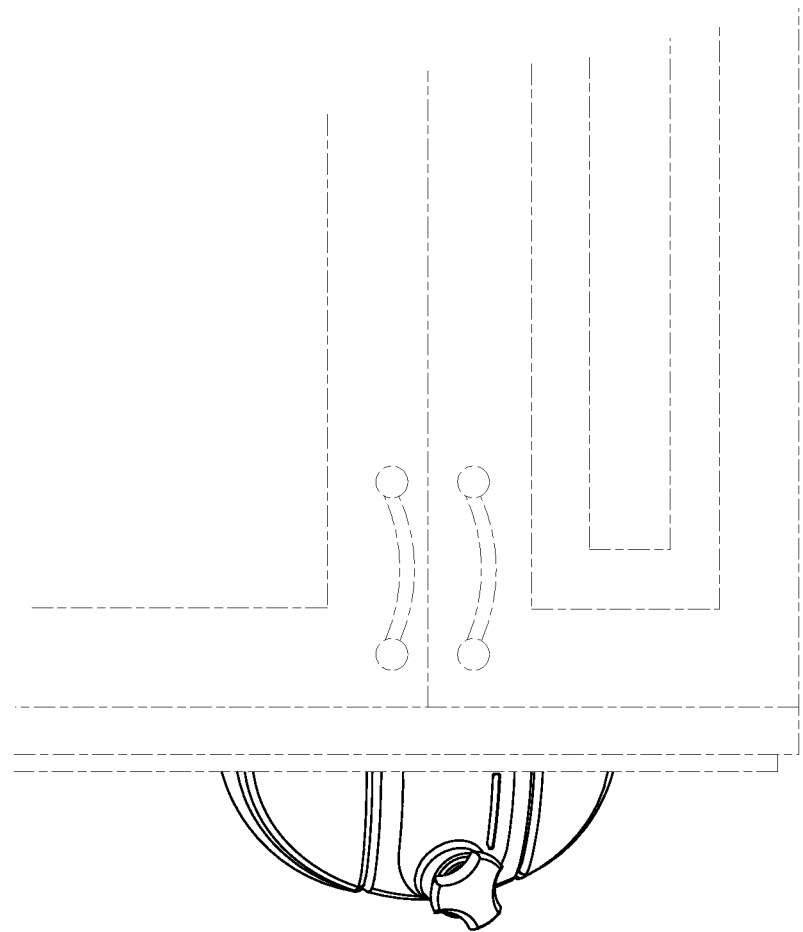
FIG. 12 illustrates a perspective view of an installed storage dispenser, according to an embodiment of the technology disclosed herein.

Referring to the drawings, FIGS. 1-12, where like reference numerals designate corresponding parts throughout the several figures, reference is made first to FIG. 1 that illustrates a typical storage dispenser 010 of the technology disclosed herein.

In an exemplary embodiment, a storage dispenser 010 is comprised of an overhead mounting plate 100, a central compartment 200, a left side compartment 300 and a right side compartment 400, where the central compartment 200, the left side compartment 300 and the right side compartment 400 are connected to the overhead mounting plate 100.

The central compartment 200 is comprised of a hinged holder 210 within which a removable dispensing assembly 500 is inserted. The dispensing assembly 500 is capable of dispensing a dry flowable consumable. The dispensing assembly 500 is comprised of a dispensing base 510, an Archimedes screw assembly 520, and a dispensing knob 530, and a discharge port 540.

Both the left side compartment 300 and the right side compartment 400 are independently hinged for easy access for storage and retrieval of accessories used with the dry flowable consumable.

In the preferred embodiment, the storage dispenser 010 includes a central compartment 200 with vertical sidewalls and parallel front and back and walls. A user empties the flowable contents of a retail package into the central compartment 200, filling it to capacity. The central compartment 200 becomes both a storage device and a dispensing device for the dry flowable consumable. The central compartment 200 is housed in an outer cowling which is hinged to the overhead mounting plate 100.

The outer cowling, housing the center compartment, is pulled down and forward to allow the central compartment 200 to be withdrawn from the cowling for refilling or placed into a dishwasher for cleaning. The bottom of the central compartment 200 is substantially perpendicular to the front, back and side walls. The bottom surface slopes forward from the back and towards a channel from the sides which is centered on the bottom running the length of the central compartment 200 back to front. This channel is sized to house an Archimedes screw assembly 520 which transports a dry flowable consumable to the dispenser opening 540. The surface of the bottom of the central compartment 200 slopes to the center, funneling the flowable into the screw which is positioned in the channel running the length of the base, front to back.

An upward facing U connector is built into the rear wall of the center channel. This connector serves as the main attach point, support and bearing for the screws end point. The U connector holds the back of screw into position so that it will rest close to, but not against the channel floor. The front one third of the screw fits into a tube which is molded into the bottom of the center module. Clumps, flakes or otherwise irregularly sized ingredients mixed into the streamable substance is automatically right sized for the receiving tube between the sharp leading edge of the helix thread and tubes sharp vertical inner edge. The interior diameter of the tube is virtually the same size as the screw's outer diameter providing airtight enclosure of the central compartment 200.

The flowable and therefore dispensable substance is measured and moved via the transport mechanism into the discharge port 540 at the front of the central compartment 200. Measured rotation of the screw is achieved when the consumer turns a dispensing knob 530 prominently attached to the exterior of the central compartment 200 and front end of the screw. The configured pitch and distance between the screws threads along with the degree of clockwise movement of the screw determine the measurement and quantity dispensed. The internal transport will importantly, incorporate a mechanism, through which normal use and operation will clean the transport and keep it free of the flowable buildup. This buildup is common and expected from certain flowable materials which tend to cake and otherwise compact or collect undesirably to the transport mechanism due to the inherent oily or tightly packed powdery nature of the product being dispensed.

In addition to providing the self-cleaning function to the transport mechanism, the dispensing assembly 500 also serves the important function of delivering, turning over and/or rotating the internal raw goods so that the normal piling up or collecting that naturally occurs from the flowable around the exit point of the dispenser will not take place. This turn-over action will insure that the dispensed product will always remain fresh.

In one embodiment a plunger activated when the turning knob is pushed into and along the extended and protruding shaft of the transport screw mechanism, opens a retractable cover to enable dispensing. Upon release of the dispensing knob 530, a spring positioned along the shaft automatically returns the dispensing knob 530 along with the connected cover to its home position via a rare earth magnet. This action keeps remnants of the streamable substance inside. Otherwise these remnants would fall from the opening and litter the counter space below. Additionally the cover to the dispensing assembly 500 opening serves as the first line of defense from outside air, humidity and vermin, which would otherwise enter the chamber. A strip of transparent material creating a window is integrated into the central compartment 200 front wall providing "at a glance" information. This feature allows the user to quickly determine the amount of flowable remaining in the container and the need to buy more product.

The mounting plate is multipurpose (a) the topside attaches both the primary and plurality of (supplementary subordinate, ancillary, or auxiliary) modules to the above positioned planer surface (b) the bottom of the mounting plate serves as the top or lid to the modules when they are fixed into their upmost stationary position. Both the central compartment 200 and the side compartments are hinged to the mounting plate 100 via side mounted parallel metal rails which equip them to swing down and forward from the sealing gasket for loading the stream able substance into the primary compartment; for both loading and retrieval of desired condiments and associated paraphernalia from the auxiliary or compartments. A single or plurality of auxiliary modules may be attached to either the left side, the right side or, in fact both sides of the central compartment 200, depending upon requirements and restraints of real estate available at the mounting surface.

The side compartments have a curved outer wall and bottom wall. The outer sidewall is both the side and back wall due to its geometrically complex surface curve. It slopes downward and forward to intersect the inside vertical wall. The side compartments are also attached to the mounting plate 100 via the side mounted parallel metal rails configured to equip them to swing down and forward from the sealing gasket. The side compartments contain a plurality of inner partitions best configurable for each individual application. The side compartments can be configured with adjustable "egg crate" partitions which will equip the compartment to hold condiments such as sugar packets, stir sticks etc. The opposite side compartment can be configured to hold basket or cone type coffee filters. The top edges of both the central compartment 200 and side compartments, when in the uppermost position, rest against the mounting plate 100 underside to hermetically seal each compartment from unwanted air, humidity and vermin.

The technology disclosed herein may also be described as follows:

1. A space-saving storage and dispensing system for flowable consumables, the system comprising:
   a housing for mounting a storage and dispensing system for flowable consumables in a space-saving manner hingedly connected under a mounting plate;
   a primary storage and dispensing module slidably located within the housing and configured to be pulled outwardly and downwardly for filling, having a pair of vertical sidewalls, a front wall, a back wall generally parallel to the front wall, and a bottom surface that slopes from the back wall to the front wall forming a channel between the pair of vertical sidewalls, the primary storage and dispensing module configured to provide sealable and airtight storage and dispensation for flowable consumables, the primary storage and dispensing module configured to be removable for cleaning; and
   a transport screw mechanism located within the channel of the primary storage and dispensing module and having a knob for turning the transport screw mechanism, the knob located on an external side of the front wall, the transport screw mechanism configured to be turned a predetermined amount of rotation by a user grasping and turning the knob and desiring a predetermined amount of the flowable consumable to be dispensed.

2. The space-saving storage and dispensing system for flowable consumables of Item 1, where the bottom surface is sloped from the pair of vertical sidewalls to a center of the bottom surface, thereby configured to funnel the flowable consumable into the transport screw mechanism horizontally located within the channel between the front wall and the back wall.

3. The space-saving storage and dispensing system for flowable consumables of Item 1, further comprising:
   a U-connector located within the rear wall of the primary storage and dispensing module, where the U connector is located in an upwardly facing position relative to the bottom surface, and where the U-connector is configured to hold and support an end point of the transport screw mechanism, thereby preventing the transport screw mechanism from touching the bottom surface of the primary storage and dispensing module.

4. The space-saving storage and dispensing system for flowable consumables of Item 1, further comprising:

a receiving tube, the receiving tube having a sharp vertical inner edge and being molded into the bottom surface of the primary storage and dispensing module, where approximately one third of the transport screw mechanism is located; and a means to right size any of the flowable consumable that is too large for the receiving tube, where a sharp leading edge of a helix thread of the transport screw mechanism and the sharp vertical inner edge of the receiving tube automatically right size any of the flowable consumable that is too large for the receiving tube as the transport screw mechanism is turned by the knob.

5. The space-saving storage and dispensing system for flowable consumables of Item 4, where an interior diameter of the receiving tube is minimally larger than the outer diameter of the transport screw mechanism, thus configured to provide an airtight enclosure with the primary storage and dispensing module.

6. The space-saving storage and dispensing system for flowable consumables of Item 1, further comprising:

a discharge port to provide an exit for the flowable consumable from the primary storage and dispensing module, where the predetermined amount of the flowable consumable to be dispensed is dispensed via the discharge port.

7. The space-saving storage and dispensing system for flowable consumables of Item 1, where the predetermined amount of rotation by a user grasping and turning the knob and the predetermined amount of the flowable consumable to be dispensed is determined by a configured pitch and a distance between a plurality of screw threads of the transport screw mechanism and by a degree of clockwise movement of the transport screw mechanism.

8. The space-saving storage and dispensing system for flowable consumables of Item 1, further comprising:

a means to self-clean the storage and dispensing system while it is in normal operational use, thereby configuring the storage and dispensing system to prevent a buildup of the flowable consumable in the transport screw mechanism, the receiving tube, or the primary storage and dispensing module.

9. The space-saving storage and dispensing system for flowable consumables of Item 1, further comprising:

a means to turn over and rotate the flowable consumable stored in the primary storage and dispensing module, thereby, based on the rotation of the transport screw mechanism, configuring the storage and dispensing system to prevent undesired accumulation and buildup of the flowable consumable and provide freshness.

10. The space-saving storage and dispensing system for flowable consumables of Item 1, further comprising:

a retractable cover; and a plunger, the plunger being activated when the knob is pushed into and along an extended and protruding shaft of the transport screw mechanism to open the retractable cover for dispensation of the flowable consumable.

11. The space-saving storage and dispensing system for flowable consumables of Item 10, further comprising:

a spring positioned along the extended and protruding shaft of the transport screw mechanism, the spring configured to automatically return the knob and retractable cover to its original position; and a magnet to hold the knob and retractable cover in position until a next use.

12. The space-saving storage and dispensing system for flowable consumables of Item 1, where the front wall of the primary storage and dispensing module further comprises:

a transparent view window integrally formed with the front wall of the primary storage and dispensing module thereby providing a user of the storage and dispensing system at-a-glance information as to the volume of flowable consumable remaining in the primary storage and dispensing module.

13. The space-saving storage and dispensing system for flowable consumables of Item 1, where the transport screw mechanism is an Archimedean screw.

14. The space-saving storage and dispensing system for flowable consumables of Item 1, where the mounting plate further comprises:

a topside to the mounting plate, where the topside that attaches the storage and dispensing system to an above positioned planar surface; and a bottom side to the mounting plate, where the bottom side serves as a lid to the primary storage and dispensing module when the primary storage and dispensing module is in a stowed position in the housing.

15. The space-saving storage and dispensing system for flowable consumables of Item 1, further comprising:

side rails, the side rails mounted on the primary storage and dispensing module, where the side rails are hingedly connected to the mounting plate and thereby equip the primary storage and dispensing module to be pulled outwardly and downwardly for purposes of loading the primary storage and dispensing module with the flowable consumable.

16. The space-saving storage and dispensing system for flowable consumables of Item 1, further comprising:

one or more secondary storage modules slidably located within the housing and configured to be pulled outwardly and downwardly to provide additional space for one or more complementary consumables that complement the flowable consumable stored within the primary storage and dispensing module.

17. The space-saving storage and dispensing system for flowable consumables of Item 1, further comprising:

one or more secondary storage modules slidably located within the housing and adjacent to the primary storage and dispensing module and configured to be pulled outwardly and downwardly to provide additional storage space, where the one or more secondary storage modules are inconspicuously located behind a faceplate.

18. The space-saving storage and dispensing system for flowable consumables of Item 1, where the flowable consumable is coffee and the system further comprises:

a bean grinder to grind coffee beans prior to placing the freshly ground beans into the primary storage and dispensing module.

19. The space-saving storage and dispensing system for flowable consumables of Item 1, further comprising:

a motor located within the storage and dispensing system, the motor being configured to rotate the transport screw mechanism.

20. The space-saving storage and dispensing system for flowable consumables of Item 1, further comprising:

a processor integrated within the storage and dispensing system; and a touch keypad located on an exterior surface of the storage and dispensing system;

where the processor and the touch keypad are configured to enable a user to program and select quantity and strength preferences of the flowable consumable to be dispensed.

21. The space-saving storage and dispensing system for flowable consumables of Item 1, further comprising:

more than one chamber located with the primary storage and dispensing module such that more than one flowable consumable is stored within and dispensed from the storage and dispensing system; and more than one transport screw mechanism such that each transport screw mechanism is located within only one of the more than one chamber located with the primary storage and dispensing module, thereby providing a dispensing mechanism for each of the more than one flowable consumable.

22. A method for storing and dispensing a flowable consumable in a space-saving storage and dispensing system for flowable consumables, the method comprising:

configuring a storage and dispensing system to comprise:
a housing for mounting a storage and dispensing system for flowable consumables in a space-saving manner hingedly connected under a mounting plate;
a primary storage and dispensing module slidably located within the housing and configured to be pulled outwardly for filling, having a pair of vertical sidewalls, a front wall, a back wall generally parallel to the front wall, and a bottom surface that slopes from the back wall to the front wall forming a channel between the pair of vertical sidewalls, the primary storage and dispensing module configured to provide sealable and airtight storage and dispensation for flowable consumables, the primary storage and dispensing module configured to be removable for cleaning; and
a transport screw mechanism located within the channel of the primary storage and dispensing module and having a knob for turning the transport screw mechanism, the knob located on an external side of the front wall, the transport screw mechanism configured to be turned a predetermined amount of rotation by a user grasping and turning the knob and desiring a predetermined amount of the flowable consumable to be dispensed;

filling the primary storage and dispensing module with the flowable consumable; and dispensing the flowable consumable by grasping and turning the knob the predetermined amount of rotation to obtain the predetermined amount of the flowable consumable.

23. The method for storing and dispensing a flowable consumable in a space-saving storage and dispensing system for flowable consumables of Item 22, where the flowable consumable is a dry powdered or granular material.

24. The method for storing and dispensing a flowable consumable in a space-saving storage and dispensing system for flowable consumables of Item 22, where the flowable consumable is a viscous liquid.

25. The method for storing and dispensing a flowable consumable in a space-saving storage and dispensing system for flowable consumables of Item 22, where the flowable consumable is ground coffee.

26. The method for storing and dispensing a flowable consumable in a space-saving storage and dispensing system for flowable consumables of Item 22, where the flowable consumable is a dietary supplement or medicine.

27. The method for storing and dispensing a flowable consumable in a space-saving storage and dispensing system for flowable consumables of Item 22, where the flowable consumable is a digestible or mixable food product.

28. The method for storing and dispensing a flowable consumable in a space-saving storage and dispensing system for flowable consumables of Item 22, the method further comprising:

configuring the storage and dispensing system to comprise:
one or more secondary storage modules slidably located within the housing and configured to be pulled outwardly and downwardly to provide additional space for one or more complementary consumables that complement the flowable consumable stored within the primary storage and dispensing module; and filling the one or more secondary storage modules with one or more complementary consumables that complement the flowable consumable stored within the primary storage and dispensing module.

29. The method for storing and dispensing a flowable consumable in a space-saving storage and dispensing system for flowable consumables of Item 22, the method further comprising:

rotating the flowable consumable stored in the primary storage and dispensing module, thereby, based on the rotation of the transport screw mechanism, configuring the storage and dispensing system to prevent undesired accumulation and buildup of the flowable consumable and providing freshness.

The foregoing description and drawings comprise illustrative embodiments of the technology disclosed herein. Having thus described exemplary embodiments of the technology disclosed herein, it should be noted by those skilled in the art that the within disclosures are exemplary only, and that various other alternatives, adaptations and modifications may be made within the scope of the technology disclosed herein. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing description and the associated drawings. Although specific terms may be employed herein, they are used in a generic and descriptive sense only and not for purposes of limitation. Accordingly, the technology disclosed herein is not limited to the specific embodiments illustrated herein, but is limited only by the following claims.

What is claimed is:

1. A space-saving storage and dispensing system for flowable consumables, the system comprising:

a housing for mounting a storage and dispensing system for flowable consumables in a space-saving manner hingedly connected under a mounting plate;
a primary storage and dispensing module slidably located within the housing and configured to be pulled outwardly and downwardly for filling, having a pair of vertical sidewalls, a front wall, a back wall generally parallel to the front wall, and a bottom surface that slopes from the back wall to the front wall forming a channel between the pair of vertical sidewalls, the primary storage and dispensing module configured to provide sealable and airtight storage and dispensation for flowable consumables, the primary storage and dispensing module configured to be removable for cleaning; and
a transport screw mechanism located within the channel of the primary storage and dispensing module and having a knob for turning the transport screw mechanism, the knob located on an external side of the front wall, the transport screw mechanism configured to be turned a predetermined amount of rotation by a user grasping and turning the knob and desiring a predetermined amount of the flowable consumable to be dispensed.

2. The space-saving storage and dispensing system for flowable consumables of claim 1, wherein the bottom surface is sloped from the pair of vertical sidewalls to a center of the bottom surface, thereby configured to funnel the flowable consumable into the transport screw mechanism horizontally located within the channel between the front wall and the back wall.

3. The space-saving storage and dispensing system for flowable consumables of claim 1, further comprising:
   a U-connector located within the rear wall of the primary storage and dispensing module, wherein the U connector is located in an upwardly facing position relative to the bottom surface, and wherein the U-connector is configured to hold and support an end point of the transport screw mechanism, thereby preventing the transport screw mechanism from touching the bottom surface of the primary storage and dispensing module.

4. The space-saving storage and dispensing system for flowable consumables of claim 1, further comprising:
   a receiving tube, the receiving tube having a sharp vertical inner edge and being molded into the bottom surface of the primary storage and dispensing module, wherein approximately one third of the transport screw mechanism is located; and
   a means to rightsize any of the flowable consumable that is too large for the receiving tube, wherein a sharp leading edge of a helix thread of the transport screw mechanism and the sharp vertical inner edge of the receiving tube automatically rightsize any of the flowable consumable that is too large for the receiving tube as the transport screw mechanism is turned by the knob.

5. The space-saving storage and dispensing system for flowable consumables of claim 4, wherein an interior diameter of the receiving tube is minimally larger than the outer diameter of the transport screw mechanism, thus configured to provide an airtight enclosure with the primary storage and dispensing module.

6. The space-saving storage and dispensing system for flowable consumables of claim 1, further comprising:
   a discharge port to provide an exit for the flowable consumable from the primary storage and dispensing module, wherein the predetermined amount of the flowable consumable to be dispensed is dispensed via the discharge port.

7. The space-saving storage and dispensing system for flowable consumables of claim 1, wherein the predetermined amount of rotation by a user grasping and turning the knob and the predetermined amount of the flowable consumable to be dispensed is determined by a configured pitch and a distance between a plurality of screw threads of the transport screw mechanism and by a degree of clockwise movement of the transport screw mechanism.

8. The space-saving storage and dispensing system for flowable consumables of claim 1, further comprising:
   a means to self-clean the storage and dispensing system while it is in normal operational use, thereby configuring the storage and dispensing system to prevent a buildup of the flowable consumable in the transport screw mechanism, the receiving tube, or the primary storage and dispensing module.

9. The space-saving storage and dispensing system for flowable consumables of claim 1, further comprising:
   a means to turn over and rotate the flowable consumable stored in the primary storage and dispensing module, thereby, based on the rotation of the transport screw mechanism, configuring the storage and dispensing system to prevent undesired accumulation and buildup of the flowable consumable and provide freshness.

10. The space-saving storage and dispensing system for flowable consumables of claim 1, further comprising:
    a retractable cover; and
    a plunger, the plunger being activated when the knob is pushed into and along an extended and protruding shaft of the transport screw mechanism to open the retractable cover for dispensation of the flowable consumable.

11. The space-saving storage and dispensing system for flowable consumables of claim 10, further comprising:
    a spring positioned along the extended and protruding shaft of the transport screw mechanism, the spring configured to automatically return the knob and retractable cover to its original position; and
    a magnet to hold the knob and retractable cover in position until a next use.

12. The space-saving storage and dispensing system for flowable consumables of claim 1, wherein the front wall of the primary storage and dispensing module further comprises:
    a transparent view window integrally formed with the front wall of the primary storage and dispensing module thereby providing a user of the storage and dispensing system at-a-glance information as to the volume of flowable consumable remaining in the primary storage and dispensing module.

13. The space-saving storage and dispensing system for flowable consumables of claim 1, wherein the transport screw mechanism is an Archimedean screw.

14. The space-saving storage and dispensing system for flowable consumables of claim 1, wherein the mounting plate further comprises:
    a topside to the mounting plate, wherein the topside that attaches the storage and dispensing system to an above positioned planar surface; and
    a bottom side to the mounting plate, wherein the bottom side serves as a lid to the primary storage and dispensing module when the primary storage and dispensing module is in a stowed position in the housing.

15. The space-saving storage and dispensing system for flowable consumables of claim 1, further comprising:
    side rails, the side rails mounted on the primary storage and dispensing module, wherein the side rails are hingedly connected to the mounting plate and thereby equip the primary storage and dispensing module to be pulled outwardly and downwardly for purposes of loading the primary storage and dispensing module with the flowable consumable.

16. The space-saving storage and dispensing system for flowable consumables of claim 1, further comprising:
    one or more secondary storage modules slidably located within the housing and configured to be pulled outwardly and downwardly to provide additional space for one or more complementary consumables that complement the flowable consumable stored within the primary storage and dispensing module.

17. The space-saving storage and dispensing system for flowable consumables of claim 1, further comprising:
    one or more secondary storage modules slidably located within the housing and adjacent to the primary storage and dispensing module and configured to be pulled outwardly and downwardly to provide additional storage space, wherein the one or more secondary storage modules are inconspicuously located behind a faceplate.

18. The space-saving storage and dispensing system for flowable consumables of claim 1, wherein the flowable consumable is coffee and the system further comprises:

a bean grinder to grind coffee beans prior to placing the freshly ground beans into the primary storage and dispensing module.

19. The space-saving storage and dispensing system for flowable consumables of claim 1, further comprising:
 a motor located within the storage and dispensing system, the motor being configured to rotate the transport screw mechanism.

20. The space-saving storage and dispensing system for flowable consumables of claim 1, further comprising:
 a processor integrated within the storage and dispensing system; and
 a touch keypad located on an exterior surface of the storage and dispensing system;
 wherein the processor and the touch keypad are configured to enable a user to program and select quantity and strength preferences of the flowable consumable to be dispensed.

21. The space-saving storage and dispensing system for flowable consumables of claim 1, further comprising:
 more than one chamber located with the primary storage and dispensing module such that more than one flowable consumable is stored within and dispensed from the storage and dispensing system; and
 more than one transport screw mechanism such that each transport screw mechanism is located within only one of the more than one chamber located with the primary storage and dispensing module, thereby providing a dispensing mechanism for each of the more than one flowable consumable.

22. A method for storing and dispensing a flowable consumable in a space-saving storage and dispensing system for flowable consumables, the method comprising:
 configuring a storage and dispensing system to comprise:
  a housing for mounting a storage and dispensing system for flowable consumables in a space-saving manner hingedly connected under a mounting plate;
  a primary storage and dispensing module slidably located within the housing and configured to be pulled outwardly for filling, having a pair of vertical sidewalls, a front wall, a back wall generally parallel to the front wall, and a bottom surface that slopes from the back wall to the front wall forming a channel between the pair of vertical sidewalls, the primary storage and dispensing module configured to provide sealable and airtight storage and dispensation for flowable consumables, the primary storage and dispensing module configured to be removable for cleaning; and
  a transport screw mechanism located within the channel of the primary storage and dispensing module and having a knob for turning the transport screw mechanism, the knob located on an external side of the front wall, the transport screw mechanism configured to be turned a predetermined amount of rotation by a user grasping and turning the knob and desiring a predetermined amount of the flowable consumable to be dispensed;
 filling the primary storage and dispensing module with the flowable consumable; and
 dispensing the flowable consumable by grasping and turning the knob the predetermined amount of rotation to obtain the predetermined amount of the flowable consumable.

23. The method for storing and dispensing a flowable consumable in a space-saving storage and dispensing system for flowable consumables of claim 22, wherein the flowable consumable is a dry powdered or granular material.

24. The method for storing and dispensing a flowable consumable in a space-saving storage and dispensing system for flowable consumables of claim 22, wherein the flowable consumable is a viscous liquid.

25. The method for storing and dispensing a flowable consumable in a space-saving storage and dispensing system for flowable consumables of claim 22, wherein the flowable consumable is ground coffee.

26. The method for storing and dispensing a flowable consumable in a space-saving storage and dispensing system for flowable consumables of claim 22, wherein the flowable consumable is a dietary supplement or medicine.

27. The method for storing and dispensing a flowable consumable in a space-saving storage and dispensing system for flowable consumables of claim 22, wherein the flowable consumable is a digestible or mixable food product.

28. The method for storing and dispensing a flowable consumable in a space-saving storage and dispensing system for flowable consumables of claim 22, the method further comprising:
 configuring the storage and dispensing system to comprise:
  one or more secondary storage modules slidably located within the housing and configured to be pulled outwardly and downwardly to provide additional space for one or more complementary consumables that complement the flowable consumable stored within the primary storage and dispensing module; and
 filling the one or more secondary storage modules with one or more complementary consumables that complement the flowable consumable stored within the primary storage and dispensing module.

29. The method for storing and dispensing a flowable consumable in a space-saving storage and dispensing system for flowable consumables of claim 22, the method further comprising:
 rotating the flowable consumable stored in the primary storage and dispensing module, thereby, based on the rotation of the transport screw mechanism, configuring the storage and dispensing system to prevent undesired accumulation and buildup of the flowable consumable and providing freshness.

* * * * *